United States Patent
Hayashi

(10) Patent No.: US 8,943,280 B2
(45) Date of Patent: Jan. 27, 2015

(54) METHOD AND APPARATUS TO MOVE PAGE BETWEEN TIERS

(75) Inventor: Shinichi Hayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 775 days.

(21) Appl. No.: 13/195,522

(22) Filed: Aug. 1, 2011

(65) Prior Publication Data

US 2013/0036250 A1    Feb. 7, 2013

(51) Int. Cl.
*G06F 3/06* (2006.01)

(52) U.S. Cl.
CPC ............. *G06F 3/061* (2013.01); *G06F 3/0647* (2013.01); *G06F 3/0649* (2013.01); *G06F 3/0665* (2013.01); *G06F 3/0685* (2013.01)
USPC ......................................... 711/161; 711/162

(58) Field of Classification Search
CPC ............................... G06F 3/0647; G06F 3/067
USPC .................................................. 711/161, 162
See application file for complete search history.

(56) References Cited

U.S. PATENT DOCUMENTS

| | | | |
|---|---|---|---|
| 8,566,942 B2 * | 10/2013 | Muttik et al. | 726/24 |
| 8,677,093 B2 * | 3/2014 | Hayashi | 711/165 |
| 2006/0010169 A1 * | 1/2006 | Kitamura | 707/200 |
| 2006/0294039 A1 | 12/2006 | Mekenkamp et al. | |
| 2007/0055713 A1 | 3/2007 | Nagai et al. | |
| 2011/0289296 A1 * | 11/2011 | Saito et al. | 711/209 |
| 2012/0290950 A1 * | 11/2012 | Rapaport et al. | 715/753 |

FOREIGN PATENT DOCUMENTS

JP      2006-79274 A1     3/2006

* cited by examiner

*Primary Examiner* — Than Nguyen
(74) *Attorney, Agent, or Firm* — Mattingly & Malur, PC

(57) ABSTRACT

The thin provisioning storage system maintains migration history between the first and the second group which the unallocated pages of virtual volume would be allocated from, and updates on writes against storage areas of virtual volume having migration history. Before the storage controller determines to migrate data allocated in the first group to the second group, the storage controller checks the migration history and if the data stored in the first group has been previously migrated from the second group and is still maintained in the second group, the storage controller would change the allocation between the virtual volume and the first group to the second group for the data subject to migration and not perform the data migration.

16 Claims, 15 Drawing Sheets

RAID GROUP INFORMATION ~422

| RAID GROUP NAME ~501 | MEDIA NAME ~502 | RAID LEVEL ~503 | MEDIA TYPE ~504 | CAPACITY [GB] ~505 |
|---|---|---|---|---|
| RG A | SSD A, SSD B, SSD C | RAID 5 | SSD SLC | 20 ~506 |
| RG B | HDD A, HDD B, HDD C | RAID 5 | HDD SAS 15,000 rpm | 100 ~507 |
| RG C | HDD D, HDD E, HDD F | RAID 5 | HDD SATA 72,00 rpm | 300 ~508 |

Fig. 5

LOGICAL VOLUME INFORMATION (423)

| LOGICAL VOLUME NAME (601) | LOGICAL VOLUME ADDRESS (602) | PAGE NUMBER (603) | PAGE ADDRESS (604) | RAID GROUP NAME (605) | RAID GROUP ADDRESS (606) |
|---|---|---|---|---|---|
| L-VOL A | 0 - 19 | PAGE 100 | 0 - 9 | RG A | 0 - 19 (607) |
|  |  | PAGE 101 | 10 - 19 |  |  |
| L-VOL B | 0 - 99 | PAGE 200 | 0 - 9 | RG B | 0 - 99 (608) |
|  |  | PAGE 201 | 10 - 19 |  |  |
|  |  | .. | .. |  |  |
| L-VOL C | 0 - 299 | PAGE 300 | 0 - 9 | RG C | 0 - 299 (609) |
|  |  | .. | .. |  |  |

Fig. 6

POOL INFORMATION

| POOL NAME ~701 | LOGICAL VOLUME NAME ~702 | VIRTUAL VOLUME NAME ~703 | CAPACITY [GB] ~704 |
|---|---|---|---|
| POOL A | L-VOL A, L-VOL B, L-VOL C | V-VOL A | 100 |
| | | V-VOL B | 100 |
| POOL B | L-VOL D, L-VOL E | V-VOL C | 200 |

VIRTUAL VOLUME INFORMATION ~425

| VIRTUAL VOLUME PAGE NUMBER ~801 | VIRTUAL VOLUME NAME ~802 | VIRTUAL VOLUME ADDRESS ~803 | LOGICAL VOLUME PAGE NUMBER ~804 | LOGICAL VOLUME NAME ~805 | LOGICAL VOLUME ADDRESS ~806 | NUMBER OF ACCESS [IOPS] ~807 |
|---|---|---|---|---|---|---|
| PAGE 0 | V-VOL A | 0 - 9 | PAGE 100 | L-VOL A | 0 - 9 | 100 ~808 |
| PAGE 1 | V-VOL A | 10 - 19 | PAGE 101 | L-VOL B | 0 - 9 | 10 ~809 |
| PAGE 2 | V-VOL A | 20 - 29 | PAGE 201 | L-VOL B | 10 - 19 | 100 ~810 |

VIRTUAL VOLUME HISTORY INFORMATION

| VIRTUAL VOLUME PAGE NUMBER | CURRENT LOGICAL VOLUME PAGE NUMBER | PREVIOUS LOGICAL VOLUME PAGE NUMBER |
|---|---|---|
| PAGE 0 | PAGE 100 | - |
| PAGE 1 | PAGE 101 | PAGE 200 |
| PAGE 2 | PAGE 201 | - |

428 DIFFERENTIAL BITMAP INFORMATION

| VIRTUAL VOLUME PAGE NUMBER 1001 | CURRENT LOGICAL VOLUME PAGE NUMBER 1002 | CURRENT LOGICAL VOLUME CHUNK NUMBER 1003 | PREVIOUS LOGICAL VOLUME PAGE NUMBER 1004 | PREVIOUS LOGICAL VOLUME CHUNK NUMBER 1005 | DIFFERENTIAL 1006 | |
|---|---|---|---|---|---|---|
| PAGE 1 | PAGE 101 | 0 | PAGE 200 | 0 | 0 | 1007 |
| PAGE 1 | PAGE 101 | 1 | PAGE 200 | 1 | 0 | 1008 |
| PAGE 400 | PAGE 500 | 0 | PAGE 600 | 0 | 1 | 1009 |
| PAGE 400 | PAGE 500 | 1 | PAGE 600 | 1 | 0 | 1010 |

TIER DEFINITION INFORMATION

| TIER (1101) | MEDIA TYPE (1102) | DEFAULT TIER (1103) |
|---|---|---|
| 1 | SSD SLC | (1104) |
| 2 | HDD SAS 15,000 rpm | X (1105) |
| 3 | HDD SATA 72,00 rpm | (1106) |

1200 — READ COMMAND

| COMMAND TYPE (1201) | VOLUME NAME (1202) | VOLUME ADDRESS (1203) |
|---|---|---|
| READ | V-VOL A | 0 - 3 |

Fig. 12B

1220 — WRITE COMMAND

| COMMAND TYPE (1221) | VOLUME NAME (1222) | VOLUME ADDRESS (1223) | DATA (1224) |
|---|---|---|---|
| WRITE | V-VOL A | 0 - 3 | ABCD |

METHOD AND APPARATUS TO MOVE PAGE BETWEEN TIERS

BACKGROUND OF THE INVENTION

The present invention relates generally to thin provisioning and tier management and, more particularly, to a method and an apparatus to move page between tiers.

In recent years, thin provisioning has become popular. Thin provisioning is a method for allocating area for a storage system that receives a write command to an unallocated area and allocates physical devices in response to the write commands. Storage systems may also reallocate frequently accessed allocated area to fast and expensive media and rarely accessed allocated area to slow and cheap media. For example, as shown in FIG. 2, a page 102 on a virtual volume 101 is mapped to a page 106 on a tier 2 logical volume 105. When the number of accesses to the page 102 increase, the storage controller copies data on the page 106 to a page 104 on a tier 1 logical volume 103 and changes the link between the page 102 and the page 106 to the page 102 and the page 104.

In actual implementation, a high percentage of pages on the virtual volume tend to be allocated to the higher tier volume and a lot of pages allocated to the lower tier volume are moved to the higher tier volume when there are frequent accesses to the page. When the number of accesses to the page 102 decreases and the number of accesses to another page on the lower tier increase, the frequently accessed area on the lower tier should be moved to higher tier and the less frequently accessed area on the higher tier should be moved to lower tier. However, it tends to take a relatively long time to copy the page 104 to the page 106 since the data transfer rate is relatively low for storage devices allocated to lower tier volume.

BRIEF SUMMARY OF THE INVENTION

Exemplary embodiments of the invention provide a system to control movement of a page between a plurality of tiers. The storage system comprises a storage controller and a plurality of storage devices, wherein the storage controller groups the plurality of storage devices into a first group and a second group and provides a virtual volume to a server, the storage controller allocates storage areas from the first and second group to the virtual volume in response to a write request, and before the storage controller determines to migrate data stored in the first group to the second group, the storage controller checks the migration history maintained in the memory and if the data stored in the first group has been previously migrated from the second group and is still maintained in the second group, the storage controller would change the allocation between the virtual volume and the first group to the second group for the data subject to migration and not perform the data migration. The storage controller would maintain migration history between the first and the second group and updates on writes against storage areas of virtual volume having the migration history.

In some embodiments, the storage system further if the second page is partially modified, copies partially modified data from the first page and then change the allocation between the virtual volume and the first page to the second page.

These and other features and advantages of the present invention will become apparent to those of ordinary skill in the art in view of the following detailed description of the specific embodiments.

BRIEF DESCRIPTION OF THE DRAWINGS

FIG. 5 illustrates an example of the RAID group information in the memory of FIG. 4B.

FIG. 6 illustrates an example of the logical volume information in the memory of FIG. 4B.

FIG. 7 illustrates an example of the pool information in the memory of FIG. 4B.

FIG. 8 illustrates an example of the virtual volume information in the memory of FIG. 4B.

FIG. 9 illustrates an example of the virtual volume history information in the memory of FIG. 4B.

FIG. 10 illustrates an example of the differential bitmap information in the memory of FIG. 4B.

FIG. 11 illustrates an example of the tier definition information in the memory of FIG. 4B.

FIG. 12A, B illustrates an example of a read command and a write command, which would be issued from the application server to the storage subsystem.

DETAILED DESCRIPTION OF THE INVENTION

Figure 1:
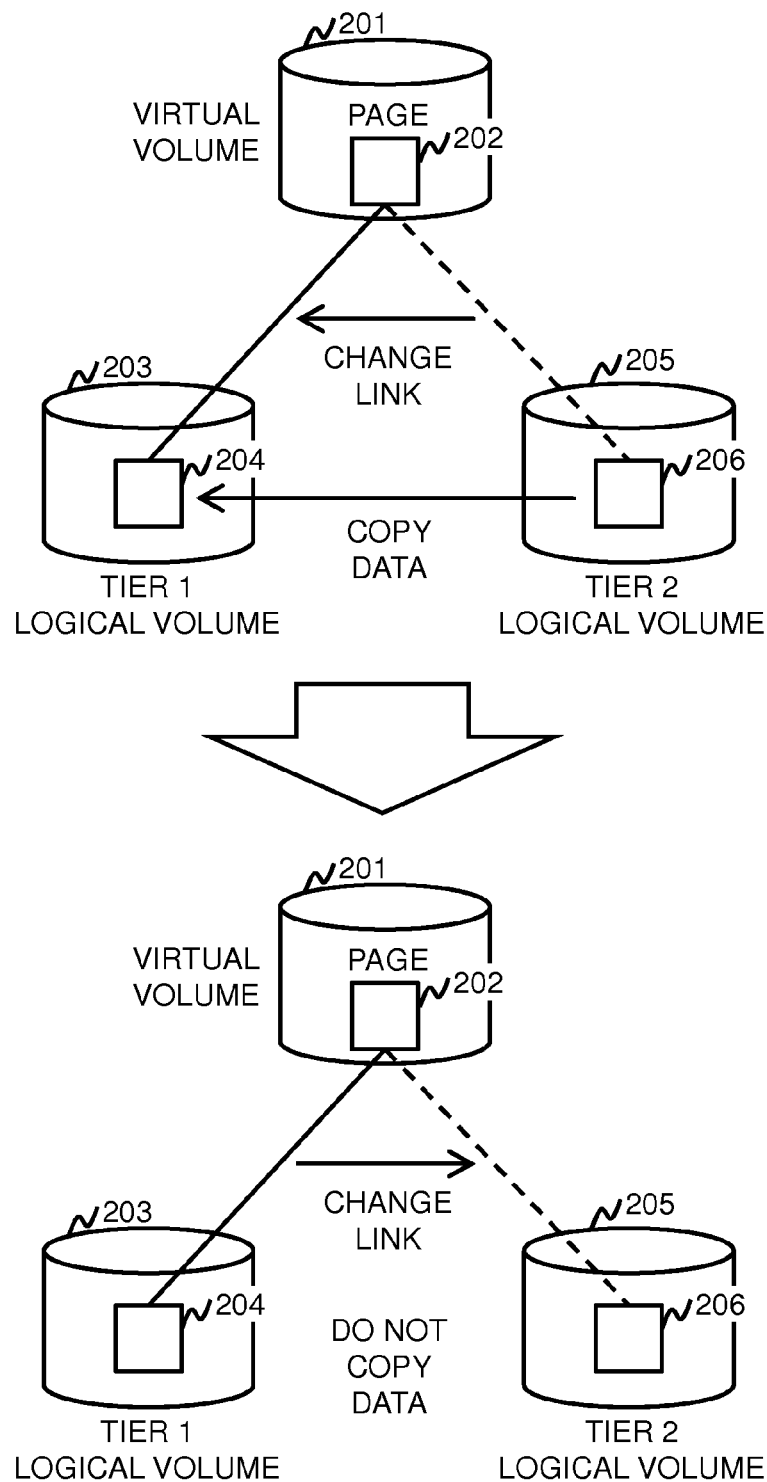
FIG. 1 illustrates an example of a diagram showing how the page is moved between the tiers.
Figure 2:
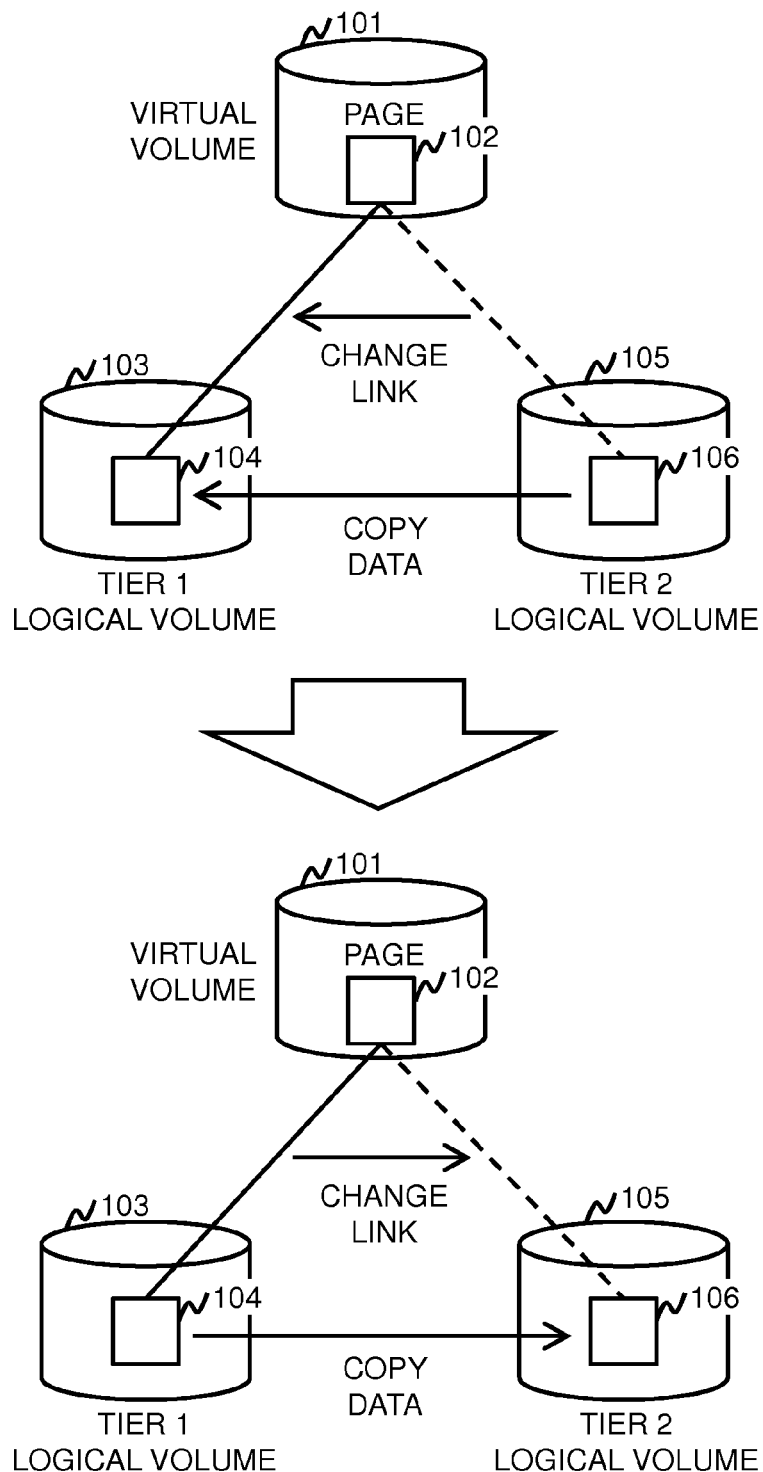
FIG. 2 illustrates a comparative example of a diagram showing how the page is moved between the tiers.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for object-based data management.

System Configuration

Figure 3:
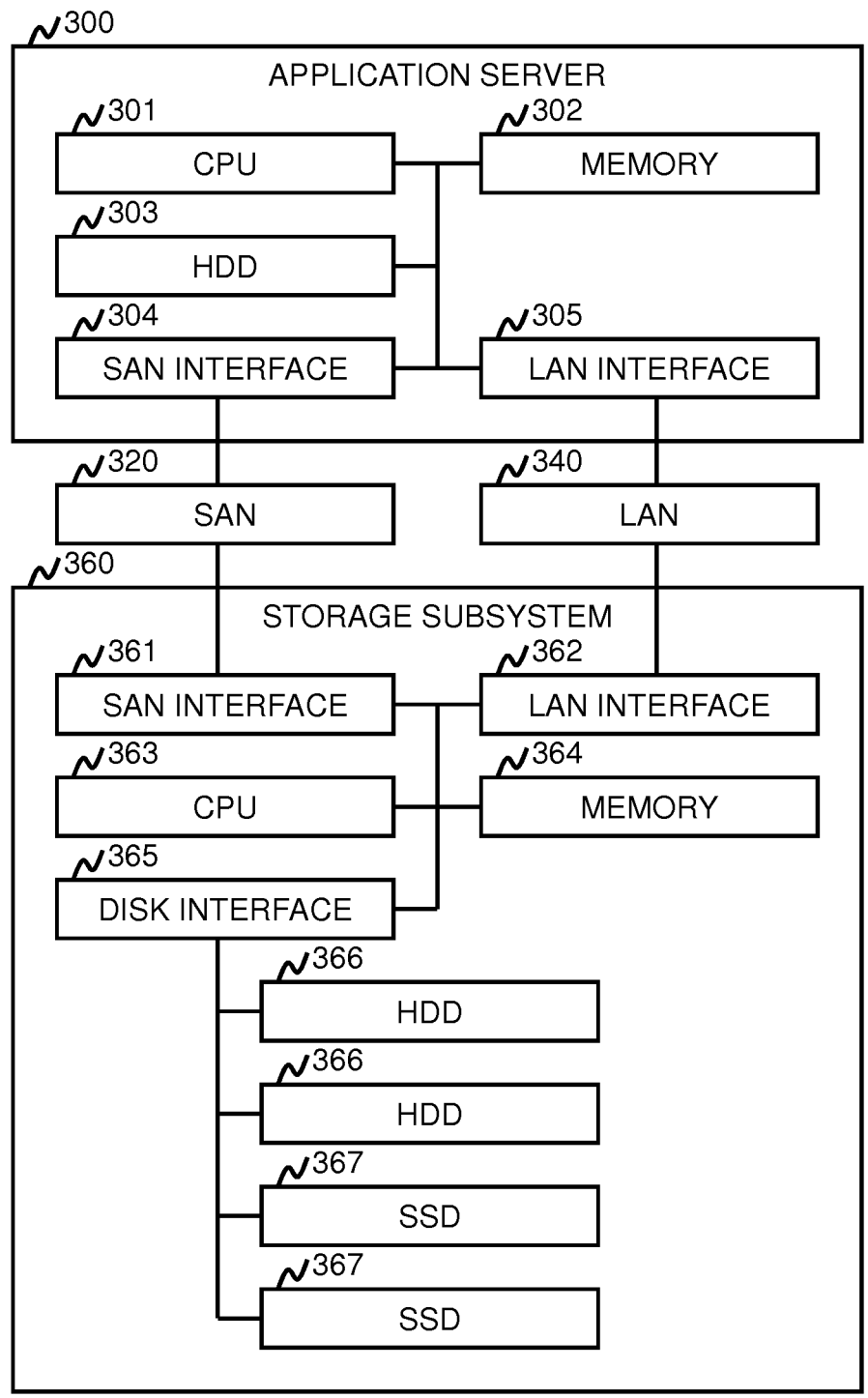
FIG. 3 illustrates an example of a hardware configuration of an information system in which the method and apparatus of the invention may be applied.

FIG. 3 illustrates an example of a hardware configuration of an information system in which the method and apparatus of the invention may be applied. The system comprises an application server 300, a SAN (Storage Area Network) 320, a LAN (Local Area Network) 340, and a storage subsystem 360. The application server 300 comprises a CPU (Central Processing Unit) 301, a memory 302, a HDD (Hard Disk Drive) 303, a SAN interface 304, and a LAN interface 305. The CPU 301 reads programs from the memory 302 and executes the programs. The memory 302 reads programs and data from the HDD 303 when the application server 300 starts and stores the programs and the data. The HDD 303 stores programs and data. The SAN interface 304 connects the application server 300 and the SAN 320. The LAN interface 305 connects the application server 300 and the LAN 340. The SAN 320 connects the application server 300 and the storage subsystem 360. The application server 300 uses the SAN 320 to send application data to the storage subsystem 360 and receive application data from the storage subsystem 360. The application server 300 uses the LAN 340 to send management data to the storage subsystem 360 and receive management data from the storage subsystem 360. The LAN 340 connects the application server 300 and the storage subsystem 360.

The storage subsystem 360 comprises a SAN interface 361, a LAN interface 362, a CPU 363, a memory 364, a disk interface 365, and a plurality of storage devices. The plurality of storage devices comprises HDDs 366 and SSDs (Solid State Drives) 367. The SAN interface 361 connects the storage subsystem 360 and the SAN 320. The LAN interface 362 connects the storage subsystem 360 and the LAN 340. The CPU 363 reads programs from the memory 364 and executes the programs. The memory 364 reads programs and data from the HDD 366 and the SSD 367 when the storage subsystem 360 starts and stores the programs and the data. The disk interface 365 connects the storage subsystem 360, the HDD 366, and the SSD 367. The HDD 366 stores programs and data. The SSD 367 stores programs and data.

Figure 4A:
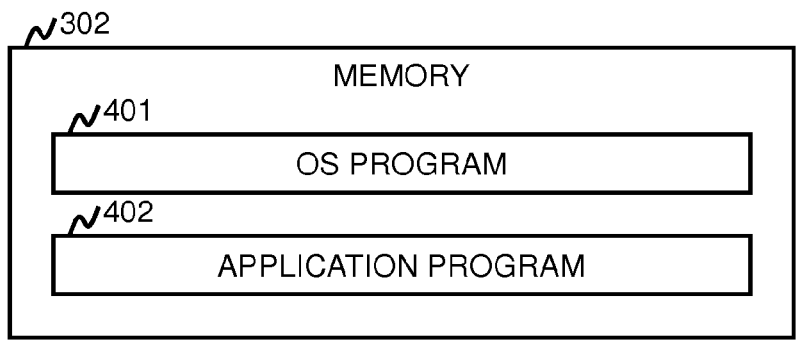
FIG. 4A illustrates an example of the memory in the application server of FIG. 3.

FIG. 4A illustrates an example of the memory 302 in the application server 300 of FIG. 3. The memory 302 comprises an OS (Operating System) program 401 and an application program 402. The OS program 401 executes the application program 402. The application program 402 (e.g., database program) reads data from the storage subsystem 360, processes data, and writes the results to the storage subsystem 360.

Figure 4B:
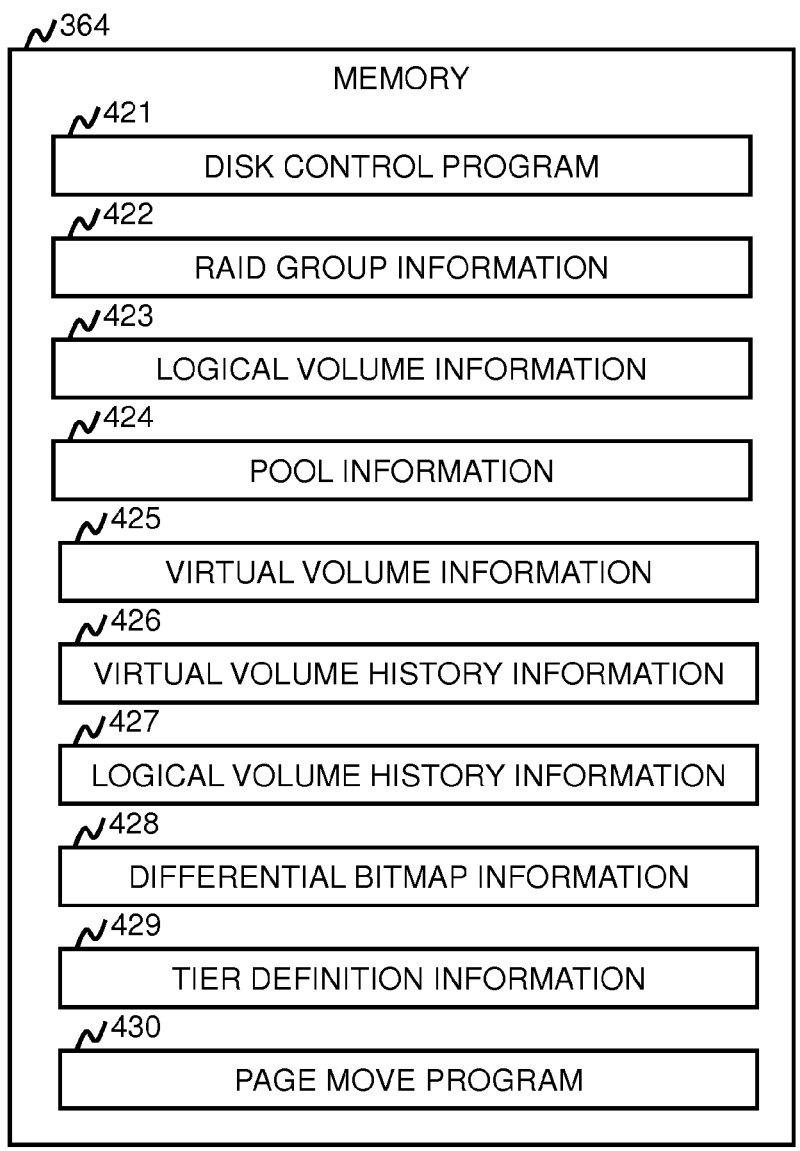
FIG. 4B illustrates an example of the memory in the storage subsystem of FIG. 3.

FIG. 4B illustrates an example of the memory 364 in the storage subsystem 360 of FIG. 3. The memory 364 in the storage subsystem 360 comprises a disk control program 421, RAID (Redundant Arrays of Inexpensive (or Independent) Disks) group information 422, logical volume information 423, pool information 424, virtual volume information 425, virtual volume history information 426, logical volume history information 427, differential bitmap information 428, tier definition information 429, and a page move program 430. The disk control program 421 receives a read command and a write command from the application server 300, reads data from the HDD 366 and the SSD 367, and writes data to the HDD 366 and the SSD 367 using the RAID group information 422, the logical volume information 423, the pool information 424, the virtual volume information 425, the virtual volume history information 426, the logical volume history information 427, the differential bitmap information 428, and the tier definition information 429.

FIG. 5 shows an example of RAID group information 422. The RAID group information 422 includes columns of a RAID group name 501, a media name 502, a RAID level 503, a media type 504, and a capacity 505. For example, the row 506 shows that "RG A" comprises "SSD A," "SSD B," and "SSD C," the RAID level of "RG A" is "RAID 5," "RG A" comprises "SSD using Single Level Cell (SLC)" and the capacity of "RG A" is "20 GB"

FIG. 6 shows an example of the logical volume information 423 in the form of a table. The logical volume information 423 includes columns of a logical volume name 601, a logical volume address 602, a page number 603, a page address 604, a RAID group name 605, and a RAID group address 606. For example, the row 607 shows that the address from "0" to "19" of "L-VOL A" is mapped to the address from "0" to "19" in "RG A" and the address of "PAGE 100" is from "0" to "9" on "L-VOL A."

FIG. 7 shows an example of the pool information 424 in the form of a table. The pool information 424 includes columns of a pool name 701, a logical volume name 702, a virtual volume name 703, and a capacity 704. For example, the row 705 shows "POOL A" comprises "L-VOL A," "L-VOL B," and "L-VOL C," the area of "POOL A" is used by "V-VOL A" and "V-VOL B" and the capacity of "V-VOL A" is "100 GB."

FIG. 8 shows an example of the virtual volume information 425 in the form of a table. The virtual volume information 425 includes columns of a virtual volume page number 801, a virtual volume name 802, a virtual volume address 803, a logical volume page number 804, a logical volume name 805, a logical volume address 806, and a number of accesses per unit time 807. For example, the row 808 shows that "PAGE 0" is mapped to the address from "0" to "9" on "V-VOL A," "PAGE 100" is mapped to the address from "0" to "9" on "L-VOL A," the number of accesses per unit time 807 to "PAGE 0" is "100 [IOPS]," and "PAGE 0" is mapped to "PAGE 100."

FIG. 9 shows an example of the virtual volume history information 426 in the form of a table. The virtual volume history information 426 includes columns of a virtual volume page number 901, a current logical volume page number 902, and previous logical volume page number 903. The virtual volume history information 426 shows currently mapped page on logical volume to page on virtual volume and previously mapped page on logical volume to page on virtual volume. For example, the row 905 shows that "PAGE 1" was mapped to "PAGE 200," and "PAGE 200" was moved to "PAGE 101," and "PAGE 1" is currently mapped to "PAGE 101".

FIG. 10 shows an example of the differential bitmap information 428 in the form of a table. The differential bitmap information 428 includes columns of a virtual volume page number 1001, a current logical volume page number 1002, a current logical volume chunk number 1003, a previous logical volume page number 1004, a previous logical volume chunk number 1005, and a differential 1006. The differential bitmap information 428 shows whether a chunk of current page and a chunk of previous page is the same data. If the chunk of current page and the chunk of previous page is the same data, the differential 1006 is "0;" and if not, the differential 1006 is "1." A chunk is a part of page. In this embodiment, chunk size is half of page size. A page comprises two chunks, chunk number "0" and chunk number "1." For example, the row 1007 shows that "PAGE 1" is mapped to "PAGE 101" and the chunk number "0" of "PAGE 101" and the chunk number "0" of "PAGE 100" is the same data.

FIG. 11 shows an example of the tier definition information 429 in the form of a table. The tier definition information 429 includes columns of a tier 1101, a media type 1102, and a default tier 1103. For example, the row 1104 shows that the media type of tier "1" is "SSD SLC" and tier "1" is not default tier and the row 1105 shows that the media type of tier "2" is "HDD SAS 15,000 rpm" and tier "2" is default tier. In this case, each tier is defined by using different storage media so that within the tier the characteristic, such as data transfer rates, are the same. However, if the characteristics are similar, then multiple type of storage media or same type of media having different revolutions per minute (rpm) may be defined for one tier.

The default tier is the tier, in which the write data to a page of virtual volume that is not allocated to a logical volume is allocated from. The intermediate tier is preferred since later adjustments between the tiers would be minimal. If the write data includes data to be accessed frequently, then the data would eventually be moved from the intermediate tier to the highest tier. On the other hand, if the write data includes data to be accessed rarely, then the data would eventually be moved from the intermediate tier to the lowest tier. By defining the default tier, the storage controller would not have to determine which tier the write data targeting to an unallocated page of a virtual volume would be in processing the write command. The default tier may be dynamically changed by the storage controller based on the how the page move program executes the page movement between tiers.

FIG. 12A shows an example of the read command 1200. The read command 1200 includes a command type 1201, a volume name 1202, and a volume address 1203. The read command 1200 is sent from the application program 402 to the storage subsystem 360. FIG. 12B shows an example of the write command 1220. The write command 1220 includes a command type 1221, a volume name 1222, a volume address 1223, and data 1224. The write command 1220 is sent from the application program 402 to the storage subsystem 360.

Figure 13:
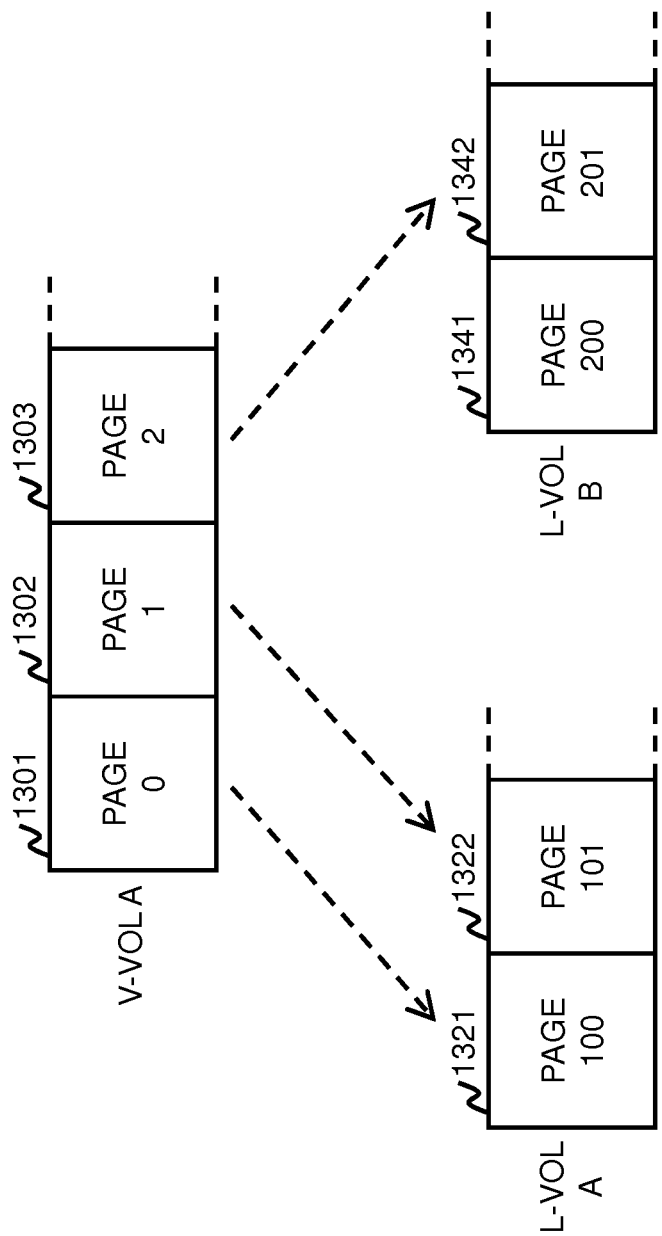
FIG. 13 is an example of a diagram showing the mapping between the virtual volume and the logical volume.

FIG. 13 shows an example of a diagram illustrating relationships between virtual volumes and logical volumes in the virtual volume information 425. For example, "PAGE 0" 1301 and "PAGE 1" 1302 of the virtual volume 1301 are mapped to "PAGE 100" 1321 and "PAGE 101" 1322 of the logical volume L-VOL A respectively. The logical volume L-VOL A is comprised of SSDs according to tables 423 and 422, thus is a tier 1 volume according to the tier definition information 429. "PAGE 2" 1303 of the virtual volume 1301 is mapped to "PAGE 201" 1342 of the logical volume L-VOL B. The logical volume L-VOL B is comprised of SAS type HDDs according to tables 423 and 422, thus is a tier 2 volume according to the tier definition information 429.

B. Process Flows

Figure 14:
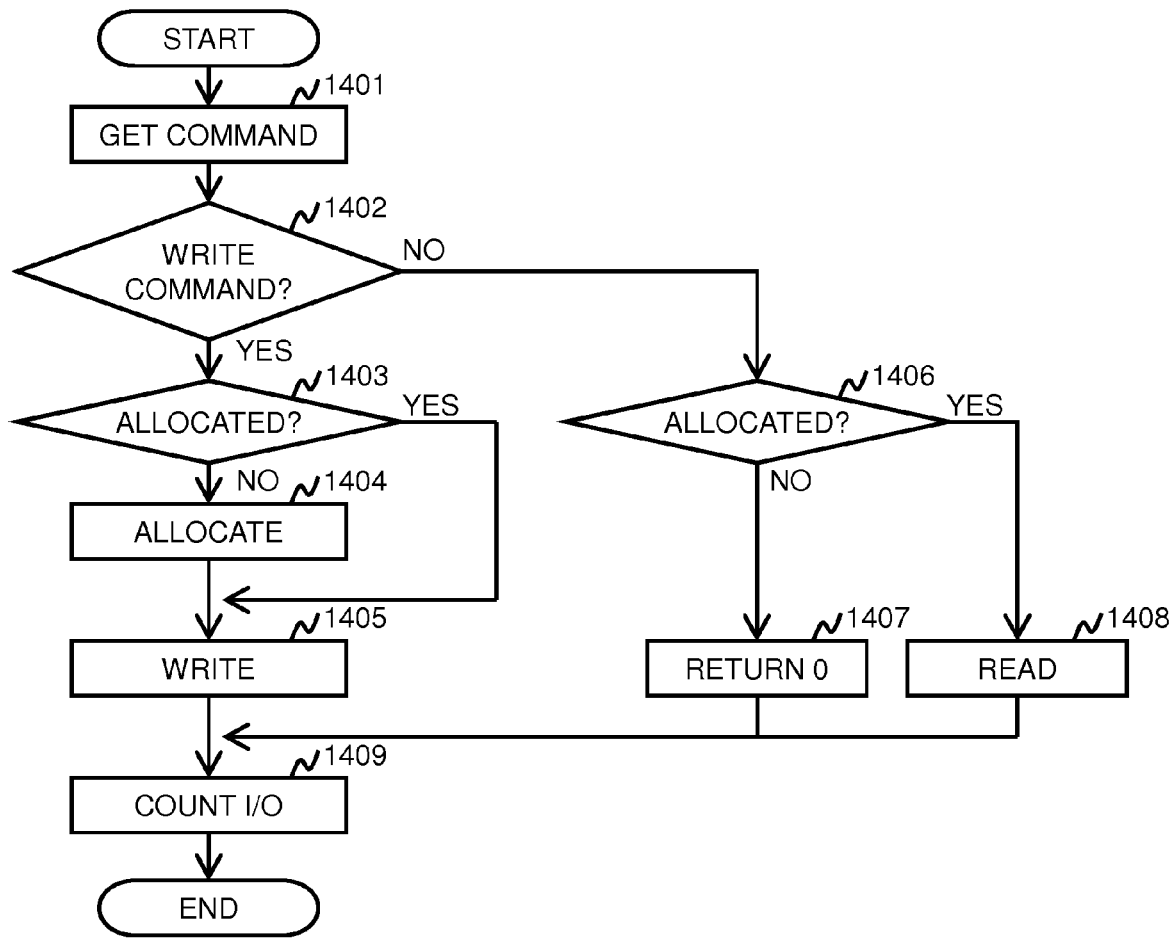
FIG. 14 is an example of a flow diagram on how the Input/Output (I/O) commands are processed for the storage subsystem.

FIG. 14 is an example of a flow diagram showing the process when the disk control program 421 receives the read command 1200 or the write command 1220 from the application program 402. In step 1401, the disk control program 421 receives the read command 1200 or the write command 1220 from the application program 402. In decision step 1402, if the command that the disk control program 421 received in step 1401 is the write command 1220, then the process goes to decision step 1403; if not, then the process goes to decision step 1406.

In decision step 1403, if an area specified by the volume name 1222 and the volume address 1223 of the write command 1220 is allocated in the virtual volume information 425, then the process goes to step 1405; if not, then the process goes to step 1404. In step 1404, the disk control program 421 allocates an unallocated area of a logical volume that media type is specified as the default tier 1103 (by tier definition information 429) to the virtual volume specified by the volume name 1222 and the volume address 1223, and updates the virtual volume information 425. If there is an unallocated page not listed in the previous logical volume page number 903, the disk control program 421 allocates the page; if not, the disk control program 421 allocates an unallocated page listed in the previous logical volume page number 903. By prioritizing to allocate to logical volume pages not including data that is moved to another tier logical volume against the virtual volume, the storage system could take advantage of reusing the data and achieving a high hit rate for holding the data when the page needs to be move to a different tier. In step

1405, the disk control program 421 gets the volume name 1222 and the volume address 1223 from the write command 1220, gets the logical volume name 805 and the logical volume address 806 from the virtual volume information 425, gets the RAID group name 605 and the RAID group address 606 from the logical volume information 423, and writes the data 1224 of the write command 1220 to an area specified by the RAID group name 605 and the RAID group address 606. If the previous logical volume page number 903 of the page specified by the volume name 1222 and the volume address 1223 is not blank, then the disk control program 421 sets the differential 1006 to "1" in order to record that this chunk is modified. For example, when the volume name 1222 is "V-VOL A" and the volume address 1223 is an address from "0" to "3," the data 1224 is written to an address from "0" to "3" on "RG A."

In decision step 1406, if an area specified by the volume name 1202 and the volume address 1203 of the read command 1200 is allocated in the virtual volume information 425, then the process goes to step 1408; if not, then the process goes to step 1407. In step 1407, the disk control program 421 returns "0" to indicate an error to the application server 300 because the area specified by the volume name 1202 and the volume address 1203 is not actually allocated and have any data. In step 1408, the disk control program 421 gets the volume name 1202 and the volume address 1203 from the read command 1200, gets the logical volume name 805 and the logical volume address 806 from the virtual volume information 425, gets the RAID group name 605 and the RAID group address 606 from the logical volume information 423, reads an area specified by the RAID group name 605 and the RAID group address 606, and returns the data.

In step 1409, if the command that the disk control program 421 received in step 1401 is the write command 1220, then the disk control program 421 increments the number of accesses 807 of the row specified by the virtual volume name 802 and the virtual volume address 803 in the virtual volume information 425 and the volume name 1222 and the volume address 1223 in the write command 1220 by "1;" if not, then the disk control program 421 increments the number of access 807 of the row specified by the virtual volume name 802 and the virtual volume address 803 in the virtual volume information 425 and the volume name 1202 and the volume address 1203 in the read command 1200 by "1."

Figure 15:
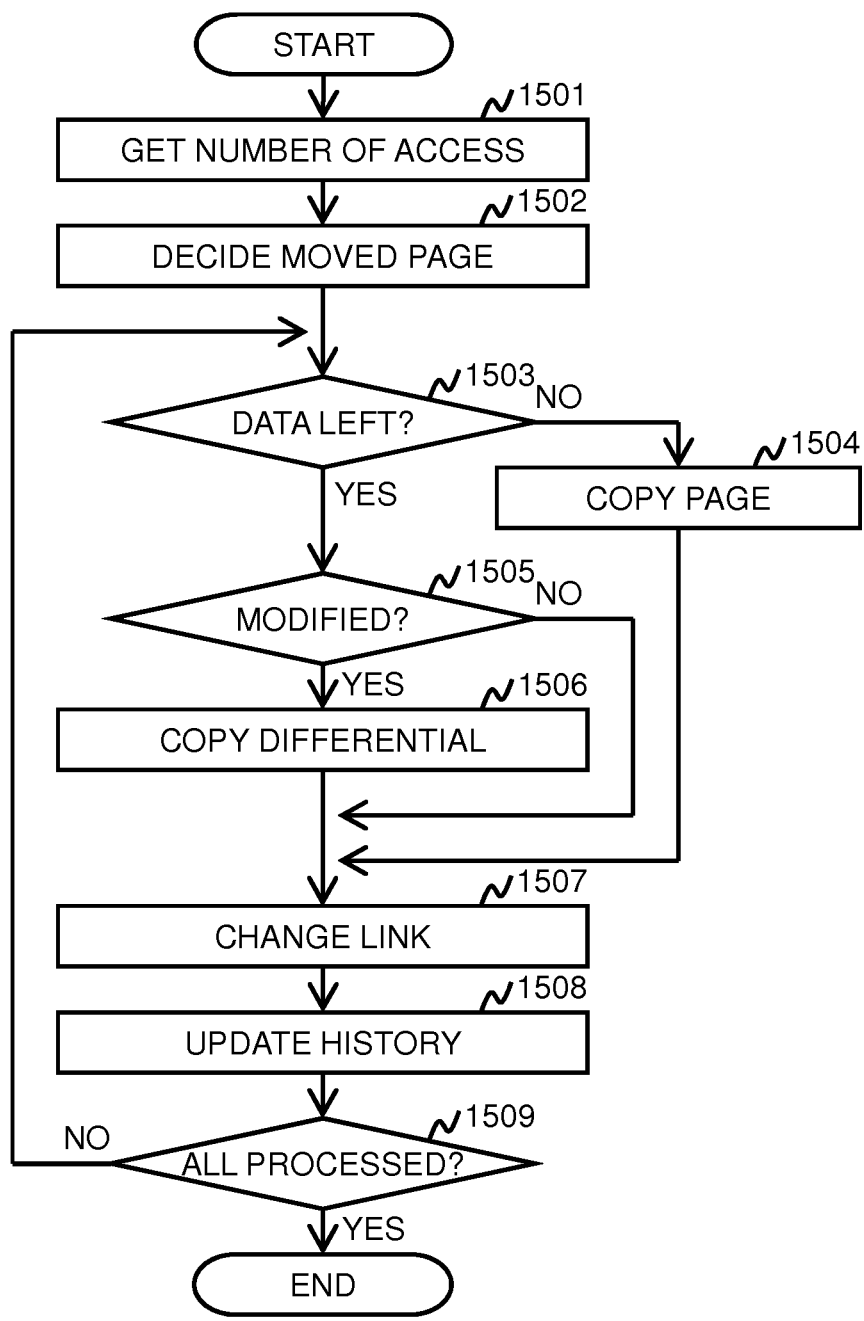
FIG. 15 is an example of a flow diagram of the page move process.

FIG. 15 is an example of a flow diagram showing the process when the page move program 430 is executed by the storage controller. The page move program moves frequently accessed pages to a higher tier and rarely accessed pages to a lower tier. In this embodiment, as defined in tier definition information 429, there are three tiers, where tier 1 is the highest tier and tier 3 is the lowest tier In step 1501, the page move program 430 gets the number of accesses 807 from the virtual volume information 425. The reason why the access to virtual volume is monitored instead of the logical volume is because it is more direct in terms of monitoring the access from the application server. In step 1502, the page move program 430 gets the logical volume name 702 in the pool information 424, gets the logical volume information 423, gets the RAID group name 501 and the media name 504 from the RAID group information 422, gets the tier definition information 429, calculates the capacity in each tier, decide pages that should be moved to another tier. For example, the capacity of tier "1" in "POOL A" is "20," the capacity of tier "2" in "POOL A" is "100," and the capacity of tier "3" in "POOL A" is "300." Therefore, "PAGE 1" should be moved to tier "2" from tier "1" and "PAGE 2" will be moved to tier "1" from tier "2" because the capacity of tier "1" in "POOL A" is 20, the used capacity of tier "1" in "POOL A" is 20, and the number of access to "PAGE 2" is larger than "PAGE 1."

In decision step 1503, the page move program 430 gets the virtual volume history information 426, the logical volume information 423, and the RAID group information 422. If the storage controller determines there is the page that has the same data on the destination tier as the page to be moved decided in step 1502, then the process goes to step 1505; if not, then the process goes to step 1504. For, "PAGE 1" will be moved to tier "2" from tier "1." "PAGE 1" is mapped to "PAGE 101." There is the same page "PAGE 200" on tier "2" as "PAGE 101" according to the virtual volume history information 426. Therefore, the process goes to step 1505. In step 1504, the page move program 430 selects an unallocated page that is not listed in the previous logical volume page number 903. If there is not an unallocated page that is not listed in the previous logical volume page number 903, then the page move program selects an unallocated page that is listed in the previous logical volume page number 903. The page move program 430 copies data of "PAGE 101" to the page selected in this step.

In decision step 1505, the page move program 430 gets the differential bitmap information 428 and checks whether the previous page found in decision step 1503 was modified. If the previous page was modified, then the process goes to step 1506; if not, then the process goes to step 1507. For example, the differential 1006 of the row 1007 and the row 1008 are "0." Therefore, "PAGE 101" was not modified, "PAGE 101" and "PAGE 200" are the same, and the process goes to step 1507. In step 1506, the page move program 430 copies the chunk that the differential 1006 is "1" in step 1505 to the previous page found in step 1503. In step 1507, the page move program 430 updates the virtual volume information 425, and the differential bitmap information 428. For example, "PAGE 1" is mapped to "PAGE 200," and the differential 1006 of the row 1107 and the row 1108 are set to "0." In step 1508, the page move program 430 updates the virtual volume history information 426. For example, the current logical volume page number 902 in the row 905 is updated to "PAGE 200," the previous logical volume page number 903 in the row 905 is updated to "PAGE 101." In decision step 1509, if all of the pages decided to be moved in step 1502 are processed, then the process ends; if not, then the process goes to step 1503.

The system configurations illustrated in FIG. 3 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for object-based tier management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising: a storage controller including a processor and a memory; and a plurality of storage devices, wherein the storage controller groups the plurality of storage devices into a first group and a second group and provides a virtual volume to a server, the storage controller allocating storage areas from the first and second group to the virtual volume in response to a write request, and wherein before the storage controller determines to migrate data stored in the first group to the second group, the storage controller checks a migration history maintained in the memory and if the data stored in the first group has been previously migrated from the second group and is still maintained in the second group, the storage controller would change the allocation between the virtual volume and the first group to the second group for the data subject to migration and not perform the data migration.

2. The storage system according to claim 1, wherein the storage controller allocates storage areas having no migration history from the first group to the virtual volume in response to a write request, prior to allocating storage areas having the migration history from the first group.

3. The storage system according to claim 2, wherein the memory maintains the migration history between the first and the second group and updates on writes against storage areas of virtual volume having the migration history.

4. The storage system according to claim 3, wherein the storage controller determines to migrate data between the first and second groups depending on a number of accesses against a storage area of the virtual volume.

5. The storage system according to claim 3, wherein the storage controller allocates the storage areas from the first and second group to the virtual volume in unit of pages, wherein a first page in the first group is subject to migration, and after the storage controller determines the data of the first page has been previously migrated from a second page in the second group, the storage controller checks the updates on the second page by referring to a differential bitmap of the corresponding page in the virtual volume.

6. The storage system according to claim 5, wherein if the second page is partially modified, the storage controller copies partially modified data from the first page and then change the allocation between the virtual volume and the first page to the second page.

7. The storage system according to claim 5, wherein the memory stores definitions of the first group and the second group by media type, media defined for the first group has a higher access speed than media defined for the second group.

8. The storage system according to claim 7, wherein the media defined for the first group is Solid State Drive, and the media defined for the second group is Hard Disk Drive.

9. The storage system according to claim 4, wherein the storage controller allocates the storage areas from the first and second group to the virtual volume in unit of pages, wherein the storage controller determines which pages of the first and second groups to migrate based on capacity of the first and second group and the number of accesses against the corresponding pages of the virtual volume.

10. A method for managing a storage system coupled to a server via a network, the method comprising: receiving a write command from the server, and if a page of a virtual volume subject to the write command is unallocated, allocating storage area from a plurality of storage devices to the page of the virtual volume; before determining to move data from a first page of the virtual volume allocated to a second group to a first group, checking a migration history from the first group to the second group and data updates against the first page of the virtual volume, changing an allocation between the virtual volume and the second group to the first group and not transferring data subject to move depending on the checked results;

wherein a storage controller changes the allocation between the virtual volume and the second group to the first group if the migration history stores that the first page of the virtual volume was previously moved from the first group to the second group and that the data was not updated against the first page of the virtual volume.

11. The method according to claim 10, maintaining by the storage controller information on accesses for each page of the virtual volume, the data updates against pages of the virtual volume, and allocation changes for pages of the virtual volume between the first and second group, wherein the storage controller determines to move data from the first page of the virtual volume allocated to the second group to the first group based on the information of accesses for each page of the virtual volume.

12. The method according to claim 10, allocating storage areas having no migration history from the first or the second group to the virtual volume in response to the write request prior to allocating storage areas having a migration history from the first or second group.

13. The method according to claim 11, wherein the storage controller checks the updates on the pages by referring to a differential bitmap.

14. The method according to claim 10, if the first page subject to move is partially modified, copying partially modified data from the second group, and then changing the allocation for the first page of the virtual volume from the second group to the first group.

15. The method according to claim 11, wherein the storage controller stores definitions of the first group and the second group by media type, media defined for the second group has a higher access speed than media defined for the first group.

16. The method according to claim 15, wherein the media defined for the first group is Solid State Drive, and the media defined for the second group is Hard Disk Drive.

\* \* \* \* \*